United States Patent [19]

Horvei

[11] Patent Number: 4,901,752
[45] Date of Patent: Feb. 20, 1990

[54] APPARATUS FOR MAINTENANCE OF BALL VALVE

[75] Inventor: Knut Horvei, Sandnes, Norway

[73] Assignee: Statoil, Norway

[21] Appl. No.: 346,023

[22] PCT Filed: Aug. 15, 1988

[86] PCT No.: PCT/NO88/00062
§ 371 Date: May 4, 1989
§ 102(e) Date: May 4, 1989

[87] PCT Pub. No.: WO89/01584
PCT Pub. Date: Feb. 23, 1989

[30] Foreign Application Priority Data
Aug. 17, 1987 [NO] Norway .................................. 873446

[51] Int. Cl.4 ............................................. F16K 43/00
[52] U.S. Cl. ............................... 137/315; 51/241 VS; 137/330
[58] Field of Search .................. 137/243, 243.6, 243.7, 137/315, 330; 51/241 VS; 408/83.5

[56] References Cited

U.S. PATENT DOCUMENTS

| 1,817,917 | 8/1931 | Carpenter | 137/243.7 |
| 4,114,483 | 9/1978 | Grimsley | 51/241 VS |
| 4,287,688 | 9/1981 | Jensen | 51/241 VS |
| 4,346,728 | 8/1982 | Sulzer | 137/243.6 |
| 4,468,158 | 8/1984 | Pearce et al. | 51/241 VS |
| 4,610,112 | 9/1986 | Kelsey | 51/241 VS |
| 4,727,901 | 3/1988 | Horvei | 137/315 |

FOREIGN PATENT DOCUMENTS

0244068 11/1987 European Pat. Off. .

Primary Examiner—George L. Walton
Attorney, Agent, or Firm—Lucas & Just

[57] ABSTRACT

Apparatus for maintenance of the moveable pipe sleeves (52), bearing surface and seals of a ball valve. The apparatus has a bonnet (7) designed to be secured to and form a tight connection with a valve flange (53) and fastened to the underside of the bonnet (7) there are: honing tool for honing of spherical sealing surfaces (56) and conical sealing surfaces (51) on a valve housing; dismounting tool for dismounting of old sealing rings on the pipe sleeves (52); mounting tool for mounting of new sealing rings on the pipe sleeves (52); rotating mechanism (8) for 90 degrees rotation of the honing tool (1) and the pipe sleeves (52).

10 Claims, 8 Drawing Sheets

APPARATUS FOR MAINTENANCE OF BALL VALVE

The present invention relates to an apparatus for maintenance of a ball valve and in particular a ball valve of the kind which is described in, for example, Norwegian patent application no. 860923.

According to the application mentioned above, the inner vital components of the ball valve such as ball/-spindle, washers, seats for washers, actuators, bearings etc. can be inspected, overhauled, repaired, replaced while the valve is for instance submerged at great depths, and without sea water seeping into the pipeline to which the valve is connected, or without flow medium leaking out of the pipeline into the surrounding medium. With the valve open in normal operating conditions, the mentioned inner vital components are separated from the flow medium in the pipeline by means of a tight barrier and are thus effectively protected against damaging influences from the flow medium and/or the pollution and particles which this may contain. The vital parts of the valve are therefore ensured a considerably better environment than is the case for other known ball valves for relevant purposes, and the vital parts are easily accessible for maintenance without the use of complicated and expensive protective equipment.

The ball valve, according to the above application, comprises internal sleeves which extend through the valve, namely from the valve housing's one opening, through the ball to the valve housing's second opening, and these sleeves create a tight continuous conduit through the valve when this is open. The ball of the valve is bisected and the sealing parts, together with spindle/actuator, are mounted on an upper ball part and the internal sleeves are mounted in the lower ball part. The two ball parts are releasingly joined to each other and when in an assembled condition form a ball/spindle device which bears against/is directed towards the valve housing and bonnet.

When the valve is open, the upper ball part, which is provided with the sealing parts together with spindle/actuator, can be dismounted by being withdrawn vertically up from the valve housing, whilst the lower ball part with the internal sleeves remains inside the valve housing, forming the tight, continuous conduit through the valve. With such a method of dismounting, most of the vital parts of the valve are accessible for inspection, control, overhauling, repair and replacement.

In the case of the ball valve which is described in the above mentioned application, the sealing rings in the sleeve cannot be replaced, nor can the seats of the valve housing be polished without seawater flowing into the pipeline and oil/gas flowing out into the surrounding medium, when the ball valve is placed on an underwater pipe.

The object of the present invention is to provide a tool which facilitates maintenance of the moveable sleeves of the above-mentioned valve and their corresponding bearing surfaces. The object is achieved with a tool which is characterized by the features which are evident in the following independent patent claims. Further advantageous characteristic features are disclosed in the dependent claims.

The invention will be more closely described in the following, with reference to the accompanying drawings where.

Figure 5:
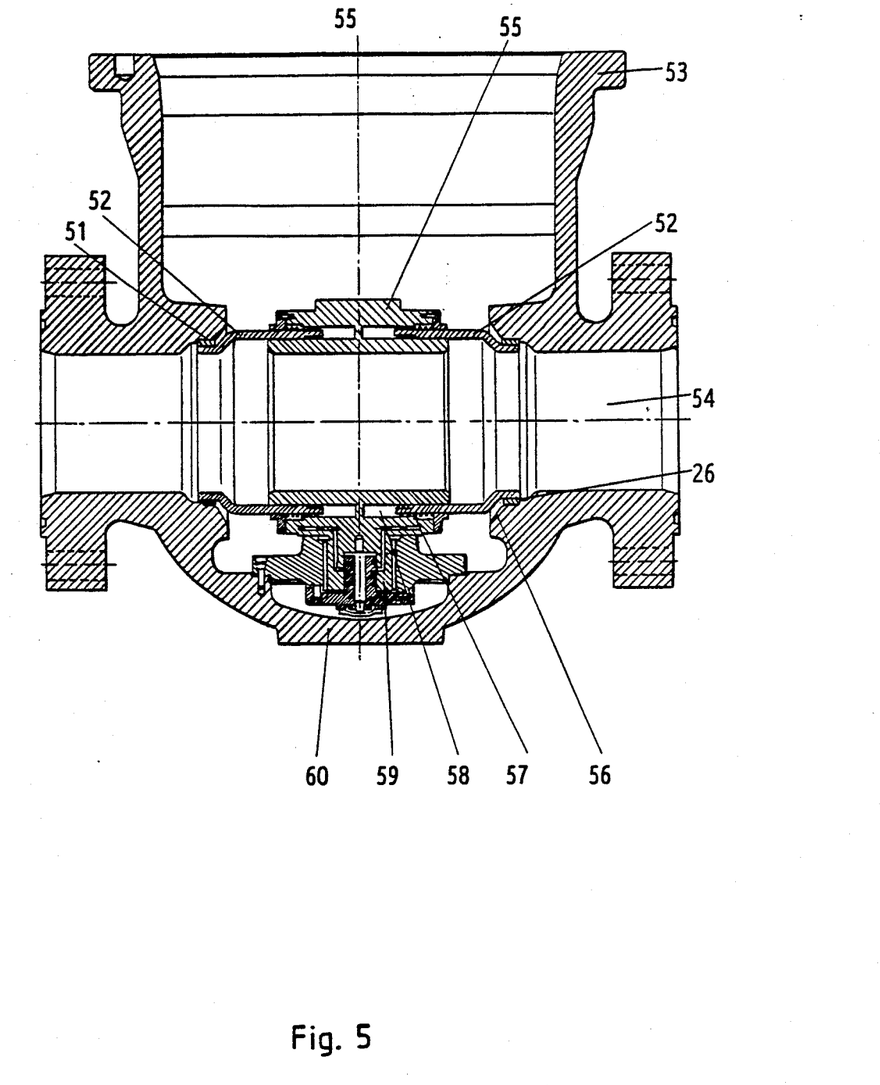
FIG. 5–8 show different stages in the maintenance procedure.

The intervention tool is shown in detail in FIGS. 1–4 and comprises a bonnet 7 with external clamps 9. The bonnet is designed in order, by means of the clamps 9, to be secured to and to form a tight connection to a valve flange 53 (FIG. 5) by means of sealing rings 28. The tool itself is secured to the under side of the bonnet 7 and comprises:

Rotating mechanism for 90 degrees rotation of the honing tool and pipe sleeves 52 (FIG. 5).

Honing tool 1 for honing of spherical sealing surfaces 56 and conical sealing surfaces 51 on a valve housing.

Device for dismounting old sealing rings 26a on the pipe sleeves 52.

Device for mounting new sealing rings 26b onto the pipe sleeves 52.

Figures 1A, 1B:
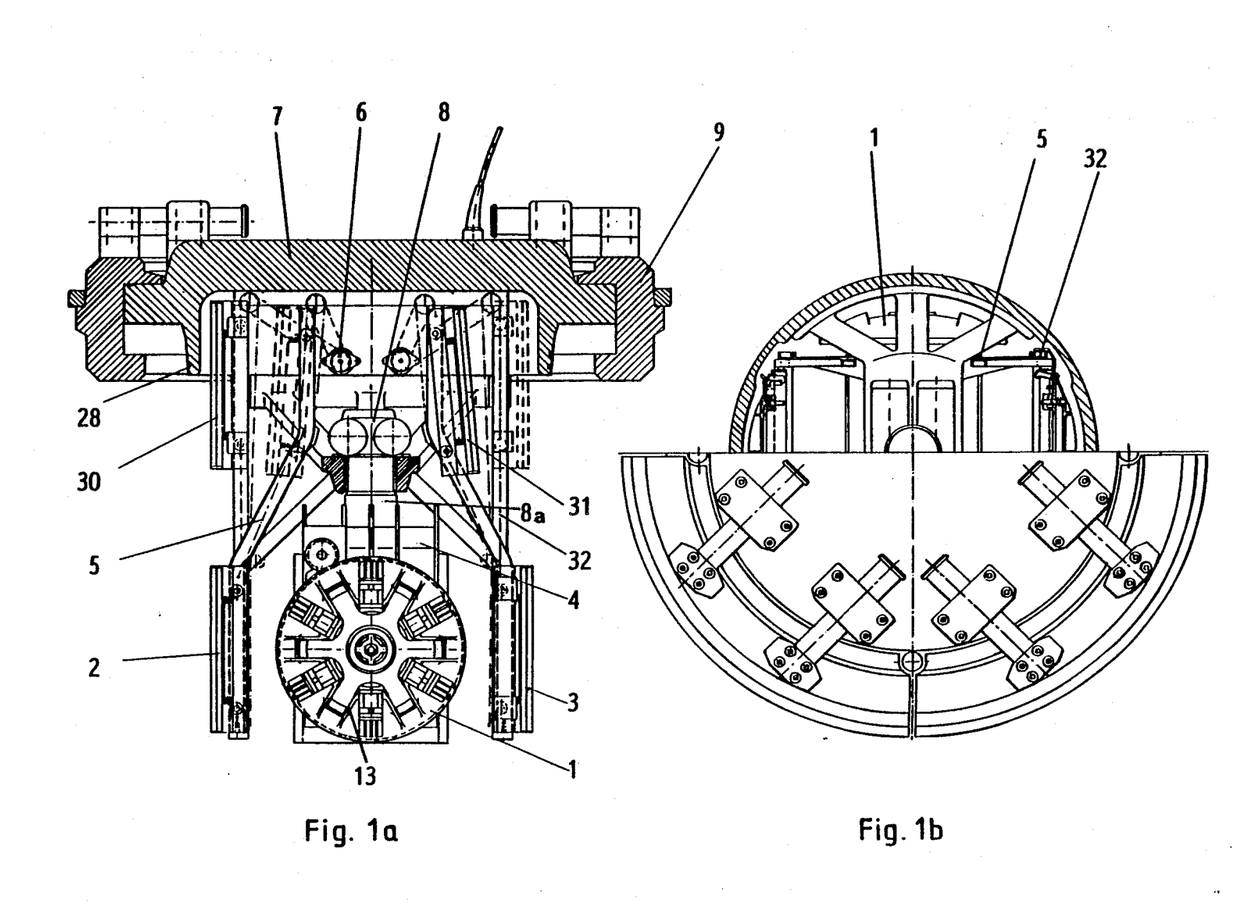
FIG. 1a shows a vertical section through the apparatus.
FIG. 1b shows a horizontal section/outline of the apparatus.

An embodiment of the rotating mechanism 8 is shown in FIG. 1a and comprises a hydraulically operated rotating cylinder 8. The rotating cylinder 8 is connected to an axle 8a for rotation of the honing tool 1 with the pipe sleeves 52 as more closely described later.

The honing tool 1 is mounted on a frame 4 which is directly connected to the shaft 8a of the rotating cylinder 8. In FIG. 1a the honing tool 1 is shown in an outline viewed from the one end of the tool, whilst in FIG. 2a and 2b it is shown in a transversal section and in a larger scale. The honing tool 1 comprises two similarly shaped rotating grinding units at each end and where only one of them is shown in the FIGS. 2a and 2b. Each grinding unit comprises a hydraulic drive motor 17 which by way of a gear rim and gear wheel 16 drives a rotating frame 15. The grinding unit comprises, further, a first grinding segment 10 for grinding a spherical sealing surface 56 in a valve housing and a second grinding segment 11 for grinding a conical seat comprising the valve sleeve's sealing surface. As is evident from FIG. 1a, the grinding segments are mounted on ribs which open the conduit for through flow during honing. The honing of the spherical sealing surfaces takes place of the hydraulic cylinder 14 pressing the grinding segments 10 radially outwards while it rotates. The rotational movement is transferred from the hydraulic motor 17. Honing takes place until the frame of the grinding segments comes to rest against a prearranged abutment. The predetermined grinding measure is then removed.

Figure 2A:
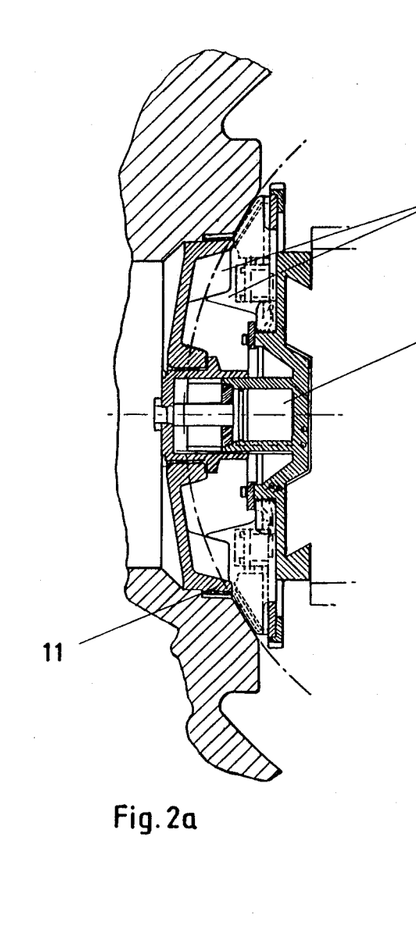
FIG. 2a and 2b show vertical sections through the honing tool.
Figure 2B:
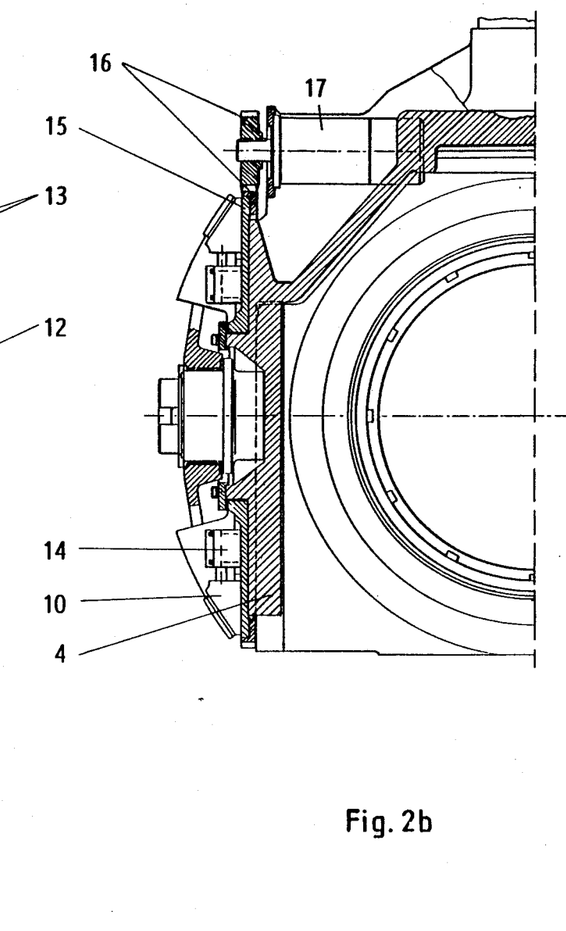
Figure 3A:
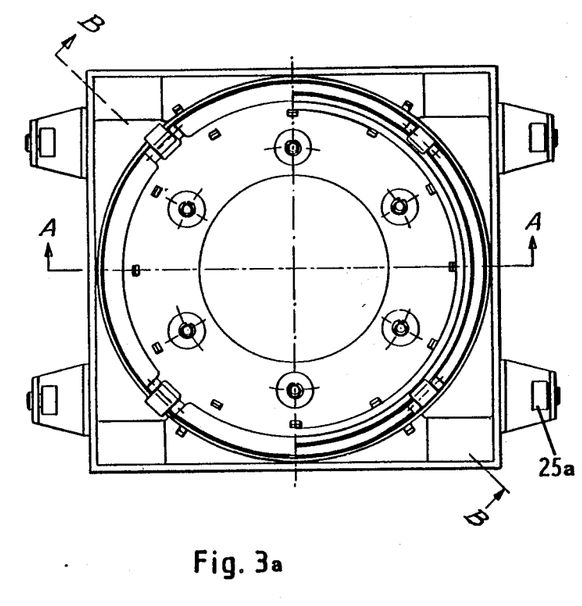
FIG. 3a–3c show a dismounting tool for the sealing rings of the sleeve.
Figure 3B:
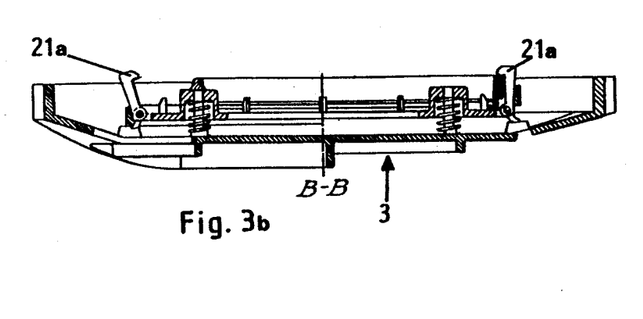
Figure 3C:
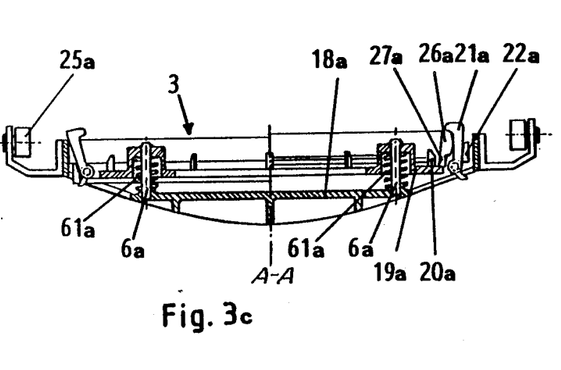

Honing of the valve sleeve's sealing surfaces is carried out by the hydraulic cylinder 12 forcing a sleeve-honing tool 11 axially forwards and into the seat. The seat and grinding elements are slightly conical, so that the radial progression is achieved automatically by the axial movement. The rotation of the honing tool is carried out by the hydraulic motor 17 and is transferred via the ribs 13.

The honing of the conical sealing surfaces 51 is carried out until the honing tool reaches it's abutment and the predetermined grinding measure is removed. Centring during honing is taken care of, partly by the hub of the tool and partly by a cylindrical part in the tool in front of the grinding segments. This (cylindrical part) moves towards a corresponding cylindrical part inside the sleeve seat.

The intervention tool also comprises a dismounting tool 3 for the dismounting of old metallic sealing rings 26a on the pipe sleeves and a mounting tool for the mounting of new sealing rings 26b adapted to the honed sealing surface. The dismounting tool is shown in detail in the FIGS. 3a-3c and includes a main frame 18a, a gripping frame 19a, wedges 20a for expanding the locking ring 27a of the sleeve, springs 61a and guide pins 6a between the main frame 18a and the gripping frame 19a, a row of claw-shaped grippers 21a and a displaceable sleeve 22a which encloses the grippers 21a and facilitates radial movement of the grippers' 21a free end. After the dismounting tool 3 has been moved into the proper position (described later), each pipe sleeve 52 is moved out by means of its own cylinder. The wedges 20a are pushed by this movement in under the locking ring 27a and cause this to expand out of its groove on the pipe sleeve 52. As the pipe sleeve is moved out, the gripping frame 19a is pushed towards the main frame 18a and against the counter force from the springs 61a. During this movement, fastly secured taps on the main fame 18a will press the moveable sleeve 22a up over the grippers 21a and push their free ends radially inwards so that the claw-formed end surface grips over the sealing ring 26a and secures it. In a preferred embodiment, the free end of the grippers is pushed radially inwards by the sleeve 22a and against the spring power of the springs arranged, for instance, underneath the grippers 21. 'When each pipe sleeve 52 is withdrawn by its own hydraulic cylinder the sealing ring 21a with the locking rings 27a will be secured by the apparatus. In the FIGS. 3b and 3c, the left half of the FIGS. show the apparatus prior to dismounting, whilst the right half shows the apparatus after dismounting has taken place and with the sealing rings 26a secured.

Figure 4A:
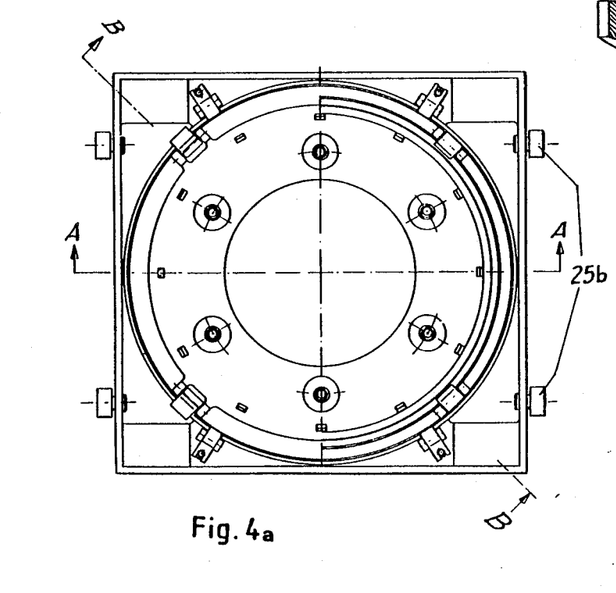
FIG. 4a–4c show a mounting tool for new sealing rings.
Figure 4B:
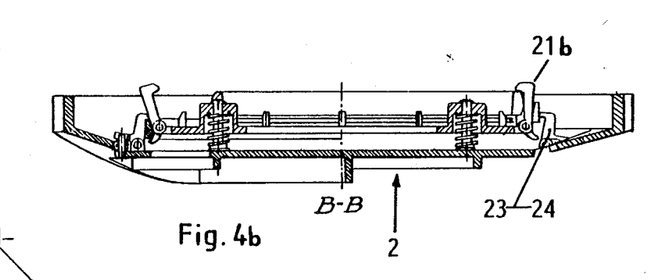
Figure 4C:
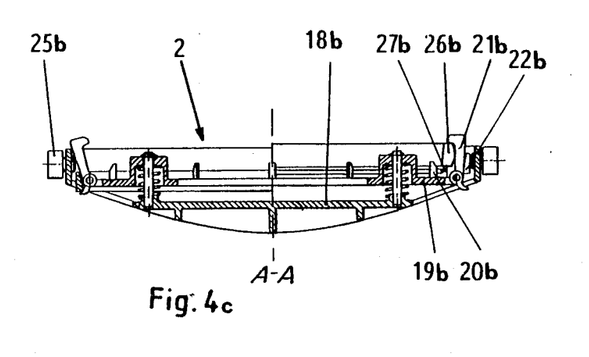

The mounting tool has a design almost identical to that of the dismounting tool and comprises a main frame 18b, a gripping frame 19b, wedges 20b, a row of claw-formed grippers 21b which basically secures a new sealing ring 26b which a locking ring 27b and a moveable sleeve 22b which encloses the grippers 21b. After the mounting tool has been moved into the proper position (will be described later), each pipe sleeve 52 is driven out by means of its own cylinder. The circle which is formed by the wedges 20b of the mounting tool, will have a somewhat lesser diameter than the internal diameter of the pipe sleeve 52. This causes the pipe sleeve 52d, when pushed forwards, to enter into the new locking ring 27b and to expand this. When the pipe sleeve 52 has reached the point where the locking ring 27b is level with the ring groove in the ring sleeve 52, the locking ring 27b will slip down into the ring groove and it will be axially fastened. As in the case of dismounting, the sleeve will push the gripping frame 19b during the movement, towards the main frame 18b against the action from the springs 61b. When the movement ceases in the sleeve's foremost position, spring-loaded hooks which sit on the main frame slip over the moveable sleeve 22b which secures the grippers 21b in gear with the new sealing ring 26b. When the pipe sleeve 52 returns, the springs expand and the hooks 23 will pull the moveable sleeve 22b away from the grippers 21b. During the final stage of the movement of the pipe sleeve 52 the free ends of the grippers 21b are pushed free of the new sealing ring 26b. As and when the pipe sleeves return yet further, each locking ring 27b will come into position at the bottom of the ring groove of the pipe sleeve 52 and will lock the sealing ring 26b into place on the end of the sleeve. The new sealing rings are now mounted.

The mode of operation of the intervention tool will be more closely explained in the following, where a normal maintenance procedure for ball valve sleeves and contact faces by means of the tool is described.

The first part of the procedure will be that the bonnet of the valve and the upper part of the ball which is fastened to the bonnet are removed while the sleeves 52 of the valve are in an open position and allow normal through flow through the valve (see FIG. 5). The hydraulic control system for the cylinder room 58 of the sleeves 52 is still in position underneath the sleeves 52.

The next step in the procedure will be the mounting of the intervention tool, which is shown in FIG. 1a, onto a valve flange 55. In order to secure the intervention tool in relation to the valve flange 55, there is a dovetail guide (not shown) preferably arranged.

Figure 6:
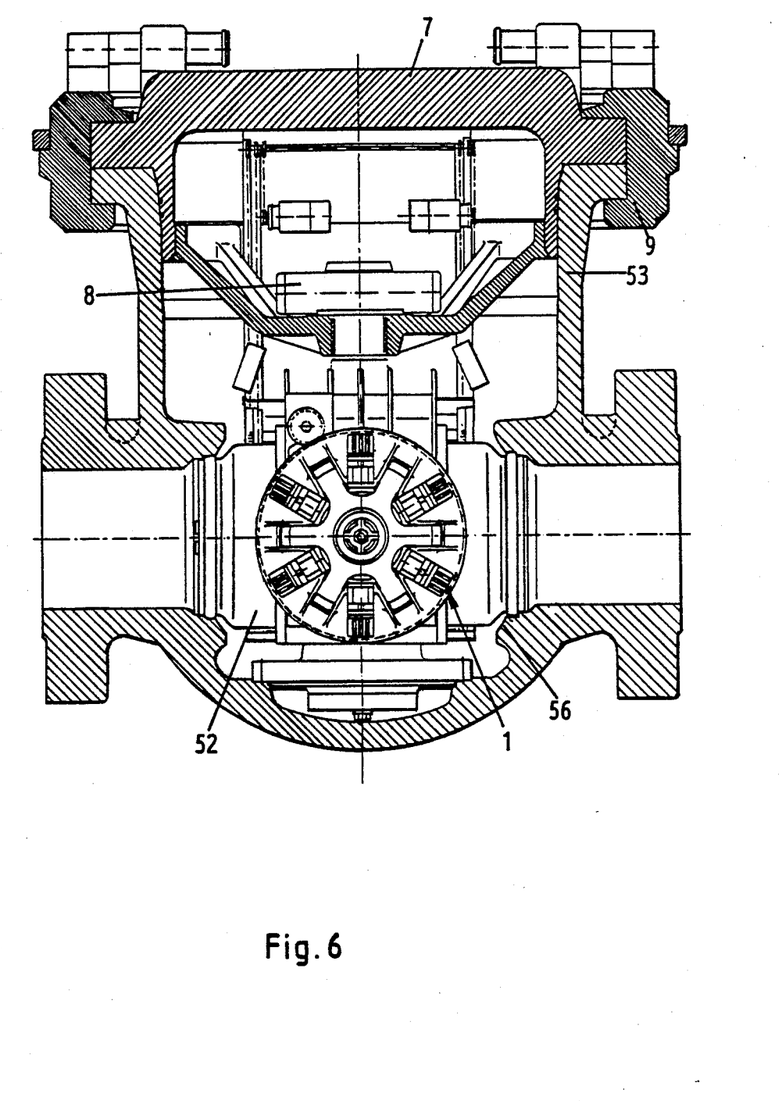

FIG. 6 shows the intervention tool mounted onto the valve where the bonnet 7 is secured to the valve flange 53 by means of the locking clamps 9 on the bonnet.

Figure 7:
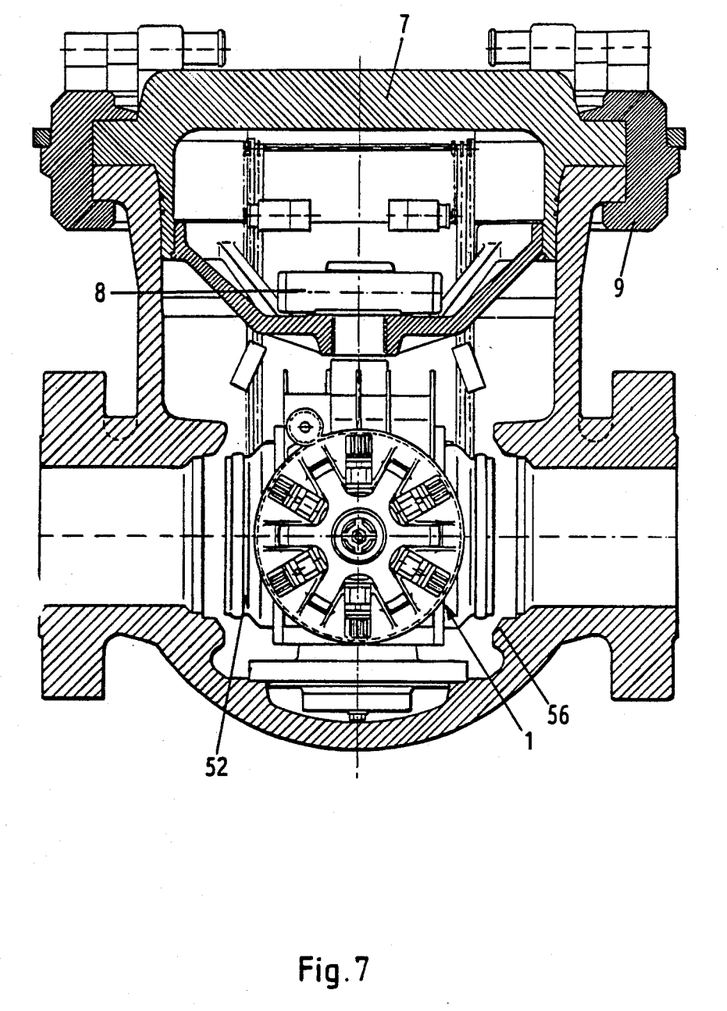

The third step (FIG. 7) in the procedure will be to retract the pipe sleeves 52. This is carried out by an annular space 57 being pressurized simultaneously with the annular space 58 being relieved. The pressure in the pipeline will thus spread to the entire inner valve housing.

Figure 8:
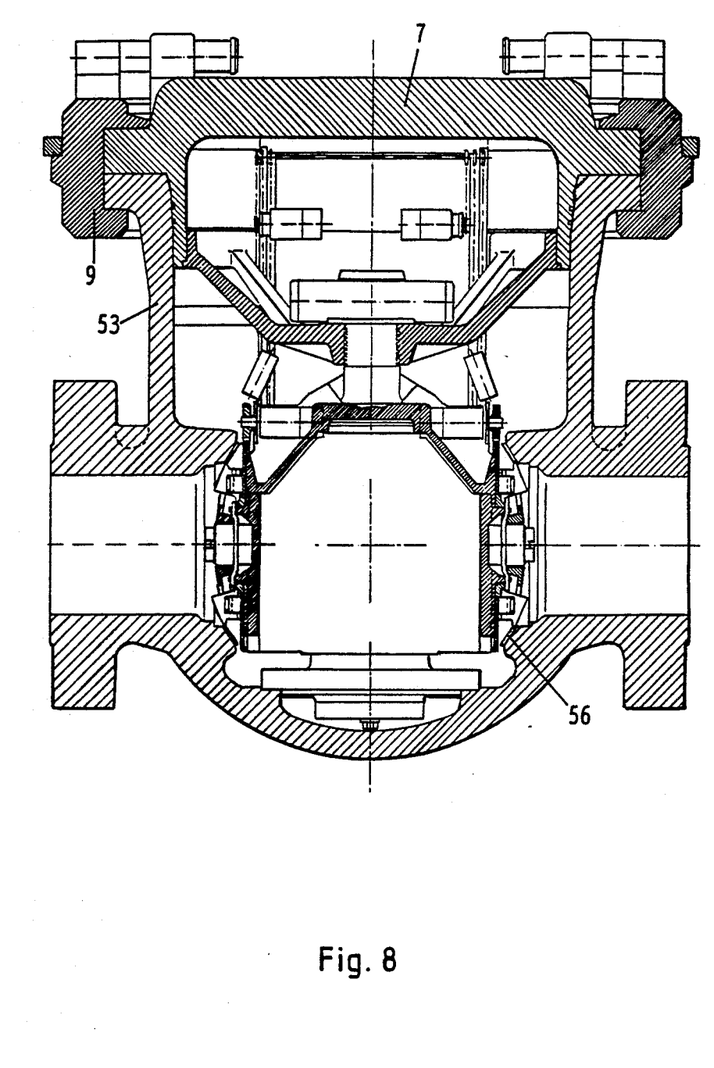

After the pressure has been equalized the fourth step in the procedure (FIG. 8) can take place, which involves the honing tool 1 and the pipe sleeves 52 with associated parts being turned 90° by means of the rotating cylinder 8. The grinding tool will now have arrived in position and will be ready for the grinding of the valve seats and with the pipe sleeves 52 pointing towards guide rails 5, 32.

The fifth step in the process will be grinding of the spherical surfaces and conical valve seats as described above. The surfaces on each side are honed simultaneously.

The sixth step in the process will be dismounting of old sealing rings 26. The dismounting tool 3 is parked prior to use on the underside of the bonnet 7 in position A. When dismounting is to take place the tool 3 is driven down into position B by means of a driving motor 6 and a chain transmission. The guide castors 25a of the dismounting tool 3 run along the more or less vertical guide rails 32. In the lower position the tool is fastened to the guide rails 32 by means of steering pins (not shown). After dismounting of old sealing rings 26a and locking rings 27a has taken place as described previously, the dismounting tool 3 is driven back to a parked position.

In the case of mounting new sealing rings 26b with locking rings 27, which constitutes the seventh step in the maintenance procedure, the mounting tool 2 is driven down from the parked position C in FIG. 1a to position D, since the guide castors 25b rest against the rails 5. Mounting of both sealing rings 26b takes place simultaneously and as described previously. When mounting is completed, the mounting tool 2 is driven back into parked position C.

Grinding of valve seats, as well as replacement of the metallic sealing rings on the pipe sleeves 52 is now completed.

The intervention tool is now to be evacuated from the valve housing. Before this can take place, the following operations must be carried out:

Lower half of ball and thereby grinding tool shall be revolved 90° angle degrees, by means of revolving cylinder 8, to the basic position (FIG. 5). The pipe sleeves 52 are driven forwards and seal off the pipe system. The pipe opening will now be insulated against the valve housing.

The pressure in the valve housing is bled out so that the pressure in the housing and the external pressure are equal.

The intervention tool can now be released from the valve housing by the locking clamps 9 being withdrawn and the bonnet 7 with mounted tool being retracted out of the valve housing.

I claim:

1. Apparatus for maintenance of a ball valve's moveable pipe seat sleeve (52), with its seating surfaces and seals characterized in that the apparatus comprises a bonnet (7) designed in order to be secured to and form a tight connection with a valve flange (53) of a valve body, said apparatus being secured to the underside of the bonnet (7) within said valve housing, said apparatus comprising:
    a grinding tool (1) for grinding spherical seating surfaces (56) and conical sealing surfaces (51) of said seating surfaces in said valve housing;
    a dismounting tool (3) for the dismounting of old sealing rings (26a) on the pipe sleeves (52);
    a mounting tool (2) for the mounting of new sealing rings (26b) on the pipe sleeves (52); and
    a turning mechanism for rotating the grinding tool (1) and the pipe sleeves (52) through a range of 90° to orient the grinding tool (1) in the required position for grinding of said valve seat.

2. Apparatus according to claim 1, characterized in that the bonnet (7) comprises external clamps (9) to be secured to the valve flange (53) and sealing rings (28) to form a tight connection.

3. Apparatus according to claim 1, characterized in that the grinding tool (1) comprises two identical rotating grinding elements where each grinding element comprises a hydraulic driving motor (17) which via a gear rim and gear wheel (16) drives a rotating frame (15), a first grinding segment (10) for honing of said spherical sealing surface (56) in said valve housing and a second grinding segment (11) for honing of said conical sealing surface which constitutes the sealing surface of the pipe sleeve, where the honing of the spherical sealing surfaces is carried out by a hydraulic cylinder (14) pressing the grinding segments (10) radially outwards whilst they are at the same time rotated by the driving motor (17), and honing of the sealing surfaces of the pipe sleeve (52) is carried out by a hydraulic cylinder (12) pressing a rotating sleevegrinding tool (11) axially forwards and into a seat.

4. Apparatus according to claim 3, characterized in that the honing tool (1) is mounted onto a frame (4) which is directly connected to the axle (8a) of the rotating mechanism (8).

5. Apparatus according to claim 3, characterized by the grinding elements (10) and the sleeve grinding tool (11) being placed on ribs which cause the pipe aperture to be open for through flow even during honing.

6. Apparatus according to claim 1, characterized in that the dismounting tool (3) comprises a main frame (18a), a gripping frame (19a), wedges (20a) for extending the locking ring (27a) of the pipe sleeve, springs (61a) and guiding pins (62a) between the main frame (18a) and the gripping frame (19a), a row of claw-formed grippers (21a) and a moveable sleeve (22a) which encloses the grippers (21a) and facilitates radial movement of the free ends of the grippers (21a).

7. Apparatus according to claim 6, characterized in that the dismounting tool (3) comprises guide castors (25a) which are placed in guide rails (32) mounted within said guide housing.

8. Apparatus according to claim 1, characterized in that the mounting tool (2) comprises a main frame (18b), a gripping frame (19b), a row of claw-shaped grippers (21b) which basically secure a new sealing ring (26b) with a locking ring (27b), and a moveable sleeve (22b) which encloses the grippers (21b).

9. Apparatus according to claim 8, characterized in that the mounting tool (2) comprises guide castors (25b) which are placed in guide rails (5).

10. Apparatus according to claim 1, characterized in that the revolving mechanism (8) comprises a hydraulically operable revolving cylinder which is connected to the axle (8a).

* * * * *